(12) United States Patent
Wu

(10) Patent No.: US 12,334,820 B2
(45) Date of Patent: Jun. 17, 2025

(54) FAST-SWITCHING CURRENT MIRROR

(71) Applicant: Murata Manufacturing Co., Ltd., Kyoto (JP)

(72) Inventor: Gary Chunshien Wu, San Diego, CA (US)

(73) Assignee: MURATA MANUFACTURING CO., LTD., Kyoto (JP)

( * ) Notice: Subject to any disclaimer, the term of this patent is extended or adjusted under 35 U.S.C. 154(b) by 244 days.

(21) Appl. No.: 17/981,012

(22) Filed: Nov. 4, 2022

(65) Prior Publication Data

US 2023/0223847 A1 Jul. 13, 2023

Related U.S. Application Data

(60) Provisional application No. 63/298,545, filed on Jan. 11, 2022.

(51) Int. Cl.
*H02M 1/08* (2006.01)
*H02M 3/156* (2006.01)

(52) U.S. Cl.
CPC ............ *H02M 3/156* (2013.01); *H02M 1/08* (2013.01)

(58) Field of Classification Search
CPC .......... G05F 1/462; G05F 1/465; G05F 1/468; G05F 1/56; G05F 1/575; G05F 1/562; G05F 1/565; G05F 1/567; G05F 1/569; G05F 1/571; G05F 1/573; G05F 1/5735; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/463; G05F 1/46; G05F 1/461
See application file for complete search history.

(56) References Cited

U.S. PATENT DOCUMENTS

| | | | | |
|---|---|---|---|---|
| 7,151,363 | B1* | 12/2006 | Scott | G05F 3/242 |
| | | | | 323/283 |
| 8,749,220 | B2* | 6/2014 | Hu | G05F 3/30 |
| | | | | 323/315 |
| 11,496,126 | B1* | 11/2022 | Abesingha | H03K 17/161 |
| 2003/0178978 | A1* | 9/2003 | Biagi | G05F 1/575 |
| | | | | 323/282 |

(Continued)

*Primary Examiner* — Sean Kayes
*Assistant Examiner* — Nusrat Quddus
(74) *Attorney, Agent, or Firm* — Haynes and Boone, LLP

(57) ABSTRACT

A current mirror circuit that allows for fast ramp-up of current for an output, thereby enabling a fast-switched current source with limited current during startup. One embodiment includes first and second transistors coupled in a current mirror configuration; a third transistor including a gate configured to be coupled to an input node, and having a conduction channel coupled between a first voltage source and the gates of the first and second transistors; a fourth transistor coupled to a second voltage source and a gate configured to be coupled to the input node; a fifth transistor including a conduction channel coupled between the conduction channels of the second and fourth transistors, and a gate coupled to a bias circuit; and a capacitor coupled between the gate of the fifth transistor and the drains of the fifth and fourth transistors.

24 Claims, 6 Drawing Sheets

(56) References Cited

U.S. PATENT DOCUMENTS

| | | | | |
|---|---|---|---|---|
| 2005/0174099 A1* | 8/2005 | Ohkubo | ............... | H03M 1/745 |
| | | | | 323/315 |
| 2007/0210858 A1* | 9/2007 | Ang | ....................... | G05F 3/262 |
| | | | | 327/543 |
| 2020/0166960 A1* | 5/2020 | Poletto | .................... | G05F 1/575 |

* cited by examiner

FAST-SWITCHING CURRENT MIRROR

CROSS-REFERENCE TO RELATED APPLICATIONS

The present application claims priority to the following provisional patent application, assigned to the assignee of the present invention, the contents of which are incorporated by reference: U.S. Patent Application Ser. No. 63/298,545 filed Jan. 11, 2022, entitled Fast-Switching Current Mirror.

BACKGROUND

(1) Technical Field

This invention relates to electronic circuits, and more particularly to current mirror circuitry.

(2) Background

In many types of circuits, there is a start-up period when the circuit is powered ON from an OFF state or from a low-power state before the circuit is fully operational. For such circuits, there may be a need for a "soft start" time interval where the in-rush of current into the circuit is limited to avoid current and/or voltage levels that may damage circuit elements, particularly field effect transistors (FETs). Such limiting of in-rush current is especially useful for circuits that include capacitors that need to charge to a specified minimum level for the circuit to operate as designed.

Take, for example, a charge pump, which is a type of DC-to-DC converter that uses capacitors (commonly called "flying capacitors") for energetic charge storage to raise or lower an input voltage. In a charge pump, there is generally a need for a soft start where current is limited to avoid a large current charging the flying capacitors.

One way to limit current to a circuit to accomplish a soft start is to limit the current applied to a "gateway" circuit element, such as a FET switch, that provides the start-up current to all or most of the remaining circuit. For example, in a charge pump, there is a "top" FET switch through which input power is supplied to a number of other charge pump circuit elements. During normal operation, the top FET switch is an active element of the circuit, generally switching between fully OFF and fully ON states. However, the top FET switch can be adapted to limit start-up in-rush current by using that FET as a current source during start-up rather than as a fully ON switching FET.

For example, for the case where a PMOS FET (PFET) is used as the top FET switch, the PFET can be used as part of a current mirror circuit to limit output current. A current mirror is designed to copy a current through one active device (such as the top switching PFET of a charge pump) by controlling the current in another active device of the circuit, keeping the output current constant regardless of loading. More generally, current mirrors are commonly used to provide bias currents and active loads to other circuitry and have other uses as well.

FIG. 1 is a schematic diagram of a prior art current mirror circuit 100 that can limit current to other circuitry (e.g., a charge pump) 102. In the illustrated example, a first PFET M1 has its conduction channel (i.e., between source and drain) coupled between a positive voltage supply $V_{DD}$ and other circuitry 102 (at an output node OUT). M1 may be an active component of the other circuitry 102 during normal operation, after start-up (for example, as the top FET switch of a charge pump). The gate (i.e., control input) of M1 is coupled to the gate of a second PFET M2 in a standard current mirror configuration. M2 is in a diode configuration with its gate connected to its drain.

A third PFET M3 has its conduction channel coupled between $V_{DD}$ and the gates of M1 and M2. The gate of M3 is coupled to an input node IN. M3 functions to turn PFETs M1 and M2 OFF (by applying $V_{DD}$ to their gates) when an input signal at the IN node is sufficiently low enough that the gate-source voltage $V_{GS\_M3}$ of M3 is at or more negative than the threshold voltage $V_{TH}$ of M3 (e.g., −0.5V), thus turning PFET M3 ON. When the input signal at the IN node becomes more positive such that $V_{GS\_M3}$ of M3 is at a more positive voltage than the threshold voltage $V_{TH}$ of M3, then M3 turns OFF.

In the illustrated example, the conduction channel of M2 is coupled between $V_{DD}$ and a current source 104, which in turn is coupled to the conduction channel of an NMOS FET (NFET) M4. The conduction channel of M4 is also coupled to a negative (relative to $V_{DD}$) voltage supply $V_{SS}$. The gate of M4 is coupled to the input node IN, and functions to turn M1 and M2 ON (by applying a sufficiently negative voltage $V_{GS}$ at their coupled gates) when an input signal at the IN node is at or greater than the threshold voltage $V_{TH}$ of M4 (e.g., +0.5V), thus turning NFET M4 ON. The signal applied to the input node IN is a logic level control signal intended to fully turn ON or fully turn OFF the current mirror, respectively, and generally would be either $V_{DD}$ or $V_{SS}$. When the input signal at the IN node becomes more negative such that $V_{GS\_M4}$ of M4 is at a more negative voltage than the threshold voltage $V_{TH}$ of M4, then M4 turns OFF. Accordingly, M4 functions to switch a current into the M1-M2 current mirror in response to an input signal applied to the input node IN.

The pair of FETs M1 and M2 comprise a standard current mirror pair. The first PFET M1 thus serves as a current limiter for the other circuitry 102, and in some applications (e.g., a charge pump) may be an active component of the other circuitry 102 during normal operation after the start-up period.

In general, M2 will be a much smaller device than M1, such as having a gate area ratio of 1:1000; of course, other ratios may be used. A large current mirror ratio is typically used to minimize the bias current through M2, which means that a small charging current through M4 is used to charge the large gate capacitance of M1 (a physically large device relative to M2). This small charging current would make the current ramp-up to a target level very slow, and limits how fast the current through M1 can be switched.

For example, FIG. 2 is a set of graphs of various voltages and currents as a function of time for the circuit of FIG. 1. Graph line 202 shows the gate-source voltage $V_{GS\_M4}$ of NFET M4 as a function of time, corresponding to a periodic square wave input signal at the IN node. Graph line 204 shows the corresponding gate-source voltage $V_{GS\_M1}$ of PFET M1 as it transitions from a high level (M1 being OFF) to a low level at or below the threshold voltage $V_{TH\_PMOS}$ for M1 (M1 then being ON). Graph line 206 shows the current through M1 corresponding to the $V_{GS\_M1}$ transitions of graph line 204. As should be clear from graph lines 204 and 206, the relatively long time required to turn M1 ON results in a relative short window of time for current flow through M1.

For many applications, it would be useful if a current mirror could operate at higher switching frequencies. One benefit of such higher switching frequencies would be that physically smaller components, such as inductors and capacitors, may be used, an important consideration in modern electronic devices, such as cellular telephones, laptop computers, and electronic pads.

Accordingly, there is a need for a current mirror circuit that allows for fast ramp up of current for an output PFET, thereby enabling the PFET to function as a fast-switched current source with limited current during startup. It would be useful is such a current mirror circuit could be adapted to use NFET circuitry.

SUMMARY

The present invention encompasses a current mirror circuit that allows for fast ramp up of current for an output FET, thereby enabling the FET to function as a fast-switched current source with controlled and limited current during startup.

One embodiment encompasses a fast-switching current source, including: a current mirror including first and second transistors configured so as to enable mirrored current flow through the first transistor when turned ON; a third transistor configured to be controlled by an input signal and coupled to a control input of the current mirror so as to be able to turn current flow through the first transistor OFF; a fourth transistor including a conduction channel configured to be coupled to a second voltage source, and a control input configured to be controlled by the input signal; a fifth transistor including a control input, and a conduction channel coupled between the control input of the current mirror and the conduction channel of the fourth transistor; a capacitor coupled between the control input of the fifth transistor and a node between the conduction channels of the fifth and fourth transistors; and a bias circuit configured to provide a reference voltage $V_{REF}$ to the control input of the fifth transistor.

Another embodiment encompasses a fast-switching current mirror circuit, including: a first transistor configured to be coupled to a first voltage source and to other circuitry; a diode-connected second transistor coupled to the first transistor in a current mirror configuration so as to enable mirrored current flow through the first transistor; a third transistor including a gate configured to be coupled to an input node, and a conduction channel configured to be coupled to the first voltage source and coupled to a gate of the first transistor and a gate of the diode-connected second transistor; a fourth transistor including a conduction channel configured to be coupled to a second voltage source, and a gate configured to be coupled to the input node; a fifth transistor including a conduction channel coupled between the conduction channel of the diode-connected second transistor and the conduction channel of the fourth transistor, and a gate coupled to a bias circuit; and a capacitor coupled between the gate of the fifth transistor and a drain of the fifth transistor and a drain of the fourth transistor.

The bias circuit includes a diode-connected sixth transistor having a conduction channel coupled in series with the conduction channel of a diode-connected seventh transistor and with a current source, the gate or control input of the diode-connected sixth transistor being connected to the gate or control input of the fifth transistor and providing a reference voltage $V_{REF}$ to the gate or control input of the fifth transistor.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION

The present invention encompasses a current mirror circuit that allows for fast ramp-up of current for an output FET, thereby enabling the FET to function as a fast-switched current source with controlled and limited current during startup.

Figure 3:
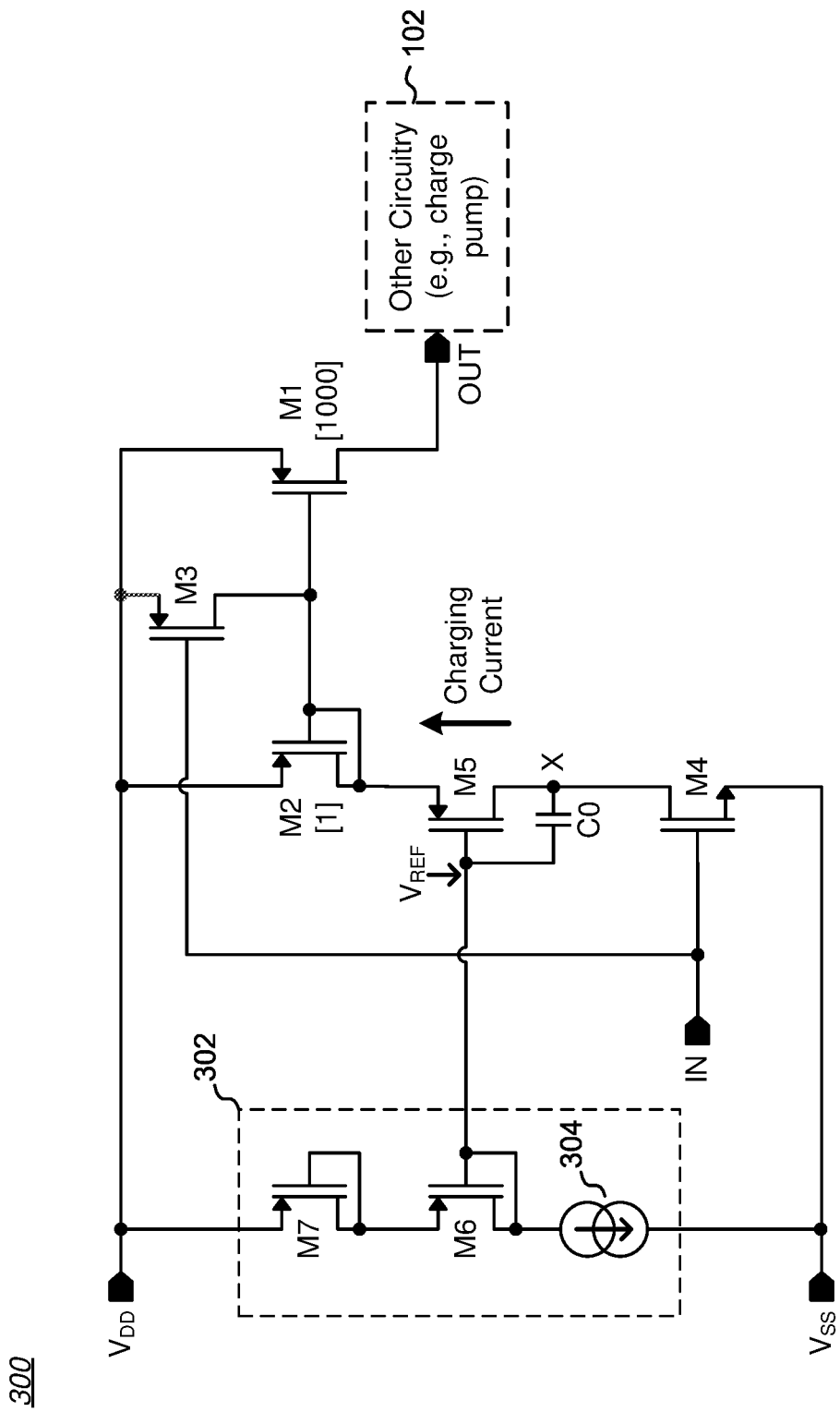
FIG. 3 is a schematic diagram of one embodiment of a fast ramp-up current mirror circuit in accordance with the present invention.

FIG. 3 is a schematic diagram of one embodiment of a PFET-based fast ramp-up current mirror circuit 300 in accordance with the present invention. PFETs M1, M2, and M3 are configured as in the circuit of FIG. 1—that is, M1 and M2 comprise a current mirror, and M3 functions to turn M1 OFF when an input signal at the IN node is sufficiently low to turn M3 ON. As in the example of FIG. 1, in the illustrated example, M2 generally will be a much smaller device than M1, such as having a gate area ratio of 1:1000; of course, other ratios may be used.

Figures 1, 2:
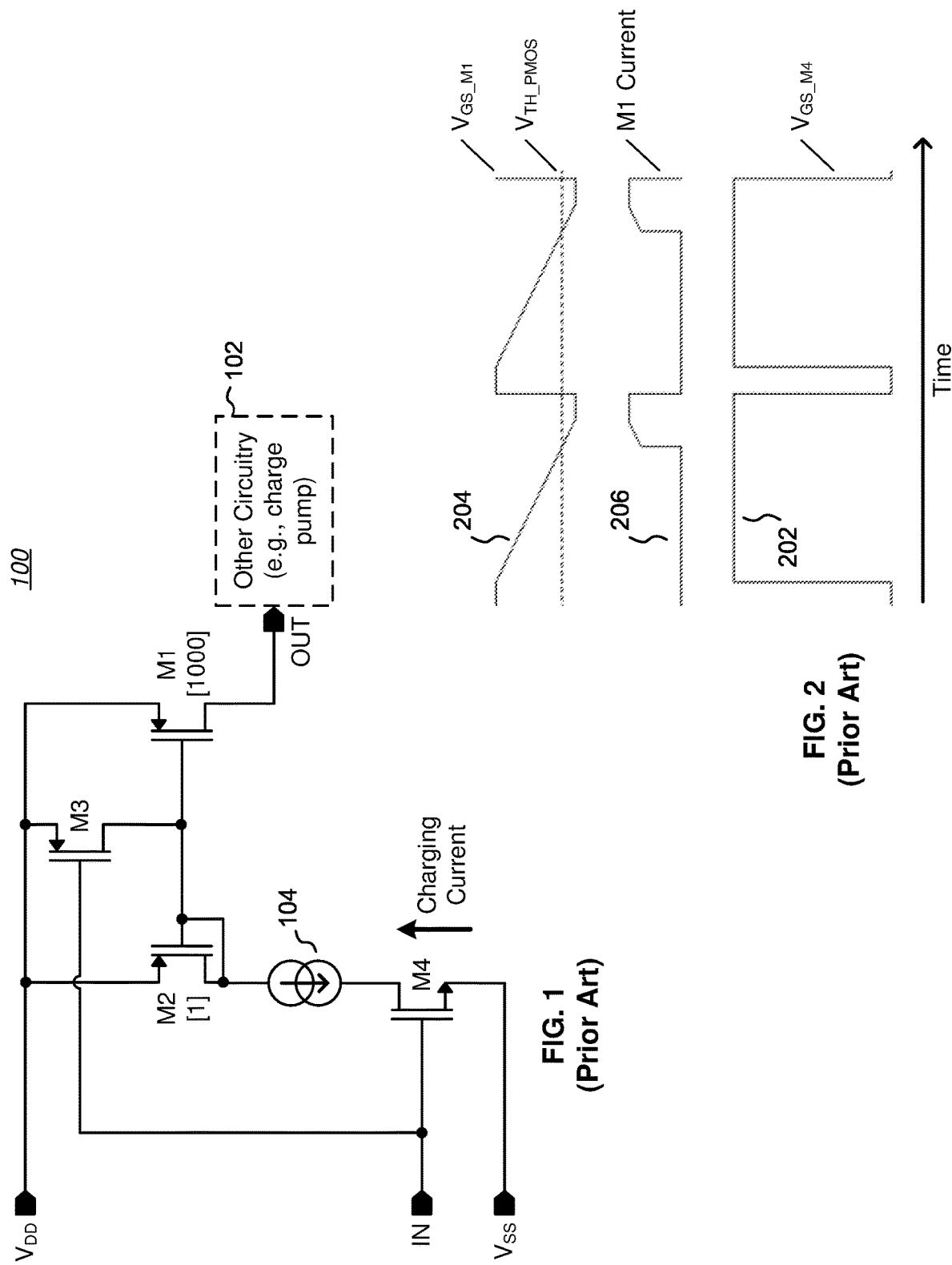
FIG. 1 is a schematic diagram of a prior art current mirror circuit that can limit current to other circuitry (e.g., a charge pump).
FIG. 2 is a set of graphs of various voltages and currents as a function of time for the circuit of FIG. 1.

In FIG. 3, NFET M4 is coupled in a somewhat similar configuration in comparison to the circuit of FIG. 1. The gate of M4 remains coupled to the input node IN and the conduction channel of M4 is coupled to $V_{SS}$ on one end. However, the other end of the conduction channel is coupled to the conduction channel of added PFET M5, and accordingly the current source 104 shown in FIG. 1 is omitted. The conduction channel of M5 is coupled between the conduction channel of M4 and the conduction channel of M2. The gate of M5 is coupled to the drain of PFET M5 by a capacitor C0, and to a bias circuit 302. The capacitor C0 is also coupled to the drain of NFET M4 at a node X.

Within the bias circuit 302, a first diode-connected PFET M6 is configured with its gate connected to its drain and to the gate of M5. The conduction channel of M6 is coupled between a current source 304 and the conduction channel of a second diode-connected PFET M7. The conduction channel of M7 is also coupled to $V_{DD}$. The current source 304 is also coupled to $V_{SS}$. As configured, both M6 and M7 are biased to be in saturation and each has a voltage drop of $V_{GS}$ (i.e., $V_{GS\_M6}$ and $V_{GS\_M7}$, which generally will be the same for similarly-sized devices co-fabricated on an integrated circuit). The bias circuit 302 provides a voltage, $V_{REF}$, to the control input (i.e., gate) of M5.

In the conventional circuit of FIG. 1, a current is switched into the M1-M2 current mirror through NFET M4. In contrast, in the new circuit shown in FIG. 3, the current in the M2/M5 branch is determined by the size ratio between M6 and M7 versus M5 and M2, as explained in greater detail below. When an input signal at the IN node is switched rapidly to turn ON the current mirror so that its voltage is greater than the threshold voltage $V_{TH}$ of M4 (e.g., +0.5V), then NFET M4 turns ON and PFET M3 turns OFF. At that moment, node X, which was previously charged to $V_{DD}$ through M3 and M5 in the ON state, is rapidly discharged to $V_{SS}$ through M4. This transient on node X is coupled through capacitor C0 to the gate of M5, which causes a transient voltage dip at the gate of M5, resulting in a greater source-to-gate (i.e., overdrive) voltage for M5, thereby increasing its current which more quickly pulls down the (large) gate of M1. The momentary voltage dip in the gate of M5 will eventually subside, and the gate voltage of M5 will return to the steady state value of $V_{REF}$.

Note that in general, the capacitor C0 should be sized so that the gate of M1 and M2 is discharged rapidly and the current through M2 is quickly ramped up to the desired current without over-exceeding the desired level.

The steady state current through M5 as well as M1 is a determined by the value of the current source 304 and the width-to-length ratios (W/L) of transistor M2, M5, M6, and M7. For example, if all 4 transistors are the same size, then the current through M2 and M5 will be substantially the same as the current source 304, which flows through M6 and M7.

Figure 4:
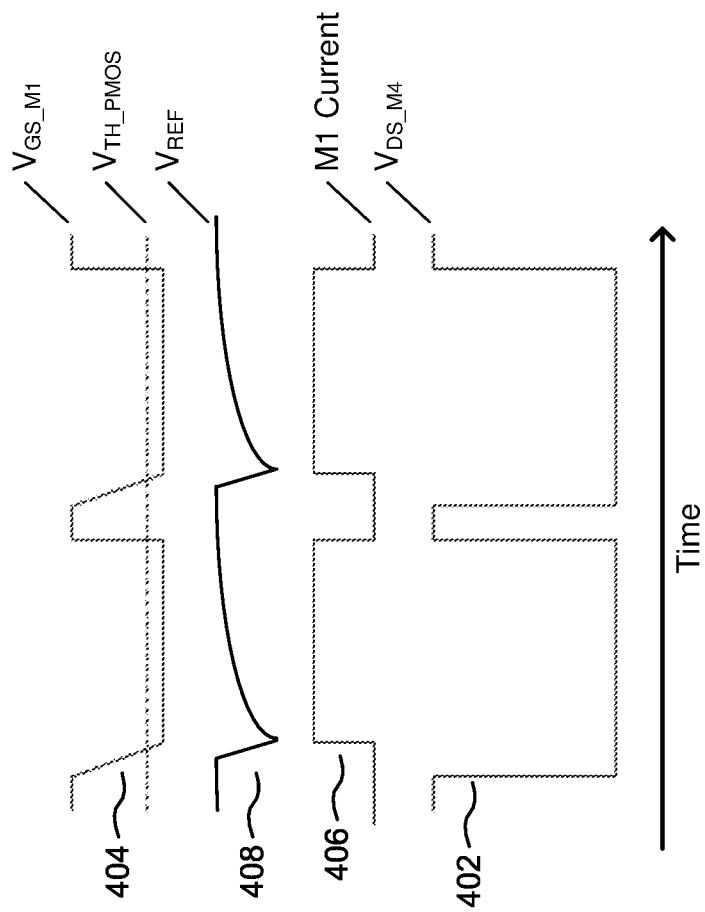
FIG. 4 is a set of graphs of various voltages and currents as a function of time for the circuit of FIG. 3.

FIG. 4 is a set of graphs of various voltages and currents as a function of time for the circuit of FIG. 3. Graph line 402 shows the drain-source voltage $V_{DS\_M4}$ of NFET M4 as a function of time, corresponding in shape to the complement of a periodic square wave input signal at the IN node (although the signal level may differ from the signal level at the IN node). Graph line 404 shows the corresponding gate-source voltage $V_{GS\_M1}$ of PFET M1 as it transitions from a high level (M1 being OFF) to a low level at or below the threshold voltage $V_{TH\_PMOS}$ for M1 (M1 then being ON). Graph line 406 shows the current through M1 corresponding to the $V_{GS\_M1}$ transitions of graph line 404. Graph line 408 shows the transient voltage dip of $V_{REF}$ in FIG. 3 caused by the capacitor C0. As should be clear from graph lines 404 and 406, the relatively short time required to turn M1 ON results in a relative long window for current flow through M1.

Figure 5:
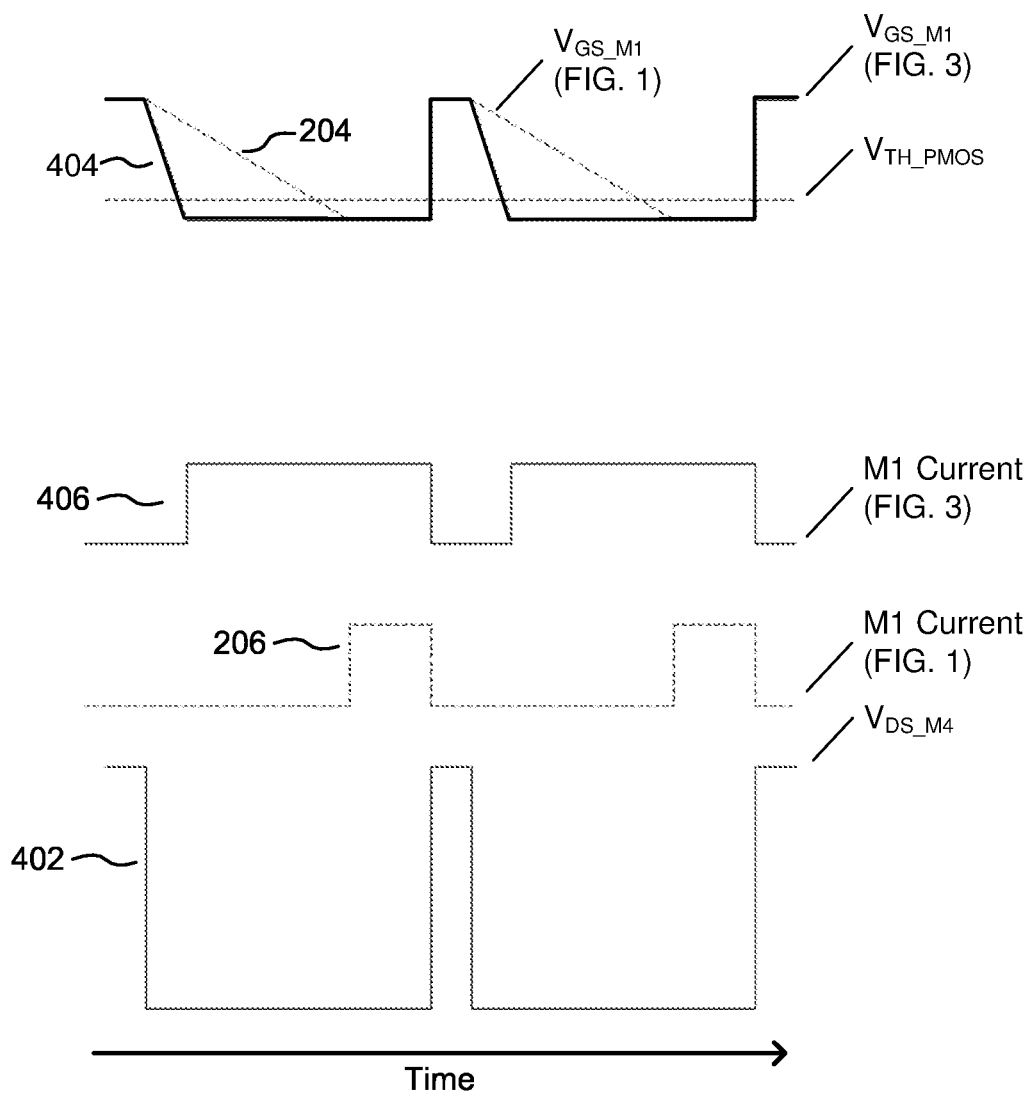
FIG. 5 is a set of graphs of various voltages and currents as a function of time, comparing the circuit of FIG. 1 to the circuit of FIG. 3.

FIG. 5 is a set of graphs of various voltages and currents as a function of time, comparing the circuit of FIG. 1 to the circuit of FIG. 3. Graph lines 204 and 404 from FIGS. 2 and 4 respectively are superimposed to show their difference in ramp rate. Graph lines 206 and 406 from FIGS. 2 and 4 respectively are stacked to show their difference in current through PFET M1. Graph line 402 shows the drain-source voltage $V_{DS\_M4}$ of NFET M4 in FIG. 3 as a function of time, corresponding to the complement of a periodic square wave input signal at the IN node (graph line 402 is essentially complementary in shape to graph line 202 in FIG. 2 (ignoring any differences in signal level and/or amplitude), which shows the gate-source voltage $V_{GS\_M4}$ of NFET M4 as a function of time corresponding to a periodic square wave input signal at the IN node).

As should be clear from FIG. 5, the fast charging time for $V_{GS\_M1}$ indicated by graph line 404 relative to graph line 204 allows current to flow through M1 for a longer time, as shown in the comparison of graph lines 406 and 206. The longer current flow through M1 may be particularly beneficial in some applications. In addition, since embodiments of the present invention allow for current through M1 to flow sooner compared to conventional designs, the frequency of operation of the entire circuit can be substantially increased, in most cases to two or more times faster than conventional designs.

As should be apparent to one of ordinary skill in the art, the current mirror circuit 300 of FIG. 3, primarily based on PFETs, may be implemented in a complementary fashion primarily using NFETs. For example, if there is an application in which a capacitor needs to be discharged at a specific rate, a primarily NFET current mirror may be useful.

Circuit Embodiments

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit components or blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

Figure 6:
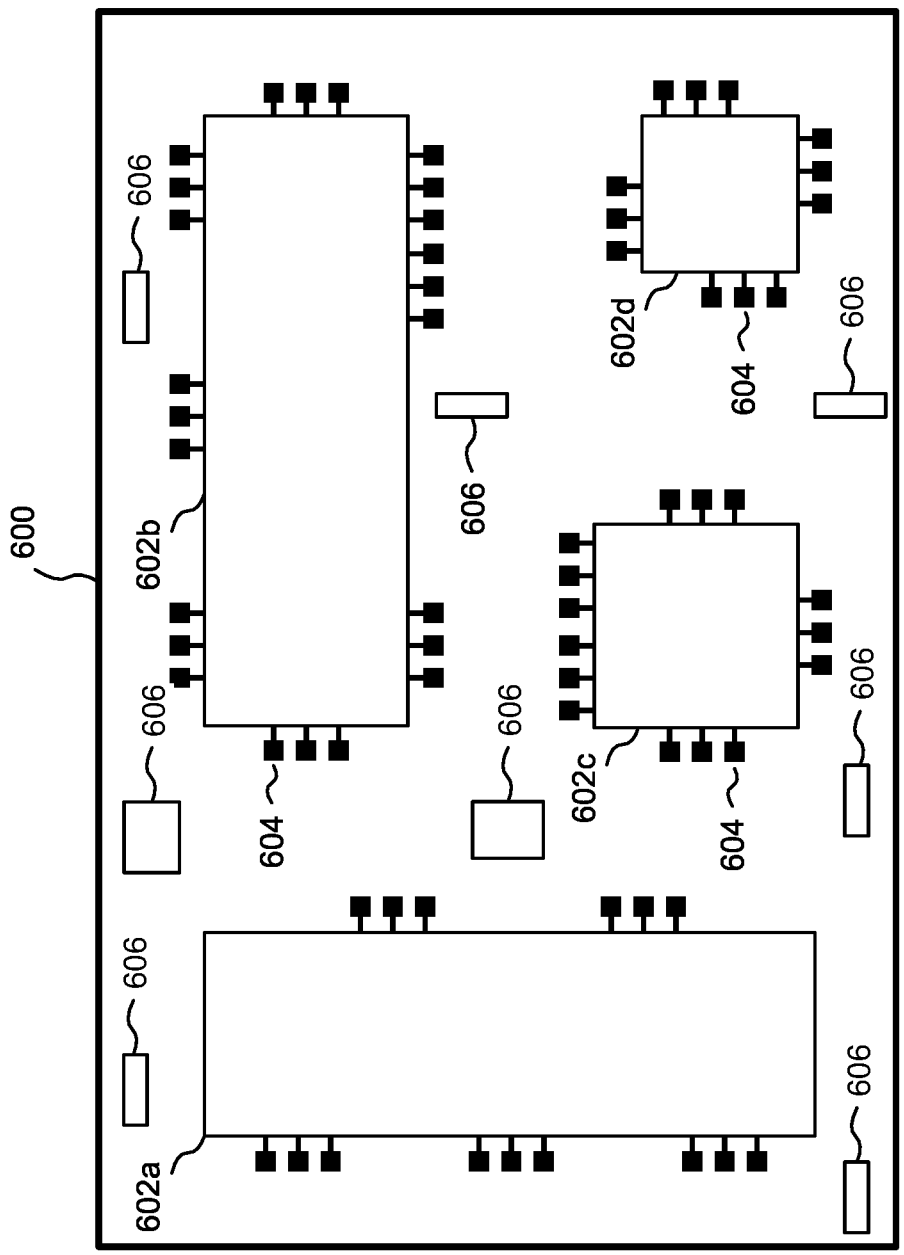
FIG. 6 is a top plan view of a substrate that may be, for example, a printed circuit board or chip module substrate (e.g., a thin-film tile).

As one example of further integration of embodiments of the present invention with other components, FIG. 6 is a top plan view of a substrate 600 that may be, for example, a printed circuit board or chip module substrate (e.g., a thin-film tile). In the illustrated example, the substrate 600 includes multiple ICs 602a-602d having terminal pads 604 which would be interconnected by conductive vias and/or traces on and/or within the substrate 600 or on the opposite (back) surface of the substrate 600 (to avoid clutter, the surface conductive traces are not shown and not all terminal pads are labelled). The ICs 602a-602d may embody, for example, power management ICs, RF ICs, baseband controllers, microprocessors, and/or other circuitry. For example, IC 602b may incorporate one or more instances of a current mirror circuit like the circuit shown in FIG. 3.

The substrate 600 may also include one or more passive devices 606 embedded in, formed on, and/or affixed to the substrate 600. While shown as generic rectangles, the passive devices 606 may be, for example, filters, capacitors, inductors, transmission lines, resistors, planar antennae elements, transducers (including, for example, MEMS-based transducers, such as accelerometers, gyroscopes, microphones, pressure sensors, etc.), batteries, etc., interconnected by conductive traces on or in the substrate 600 to other passive devices 606 and/or the individual ICs 602a-602d.

Methods

Figure 7:
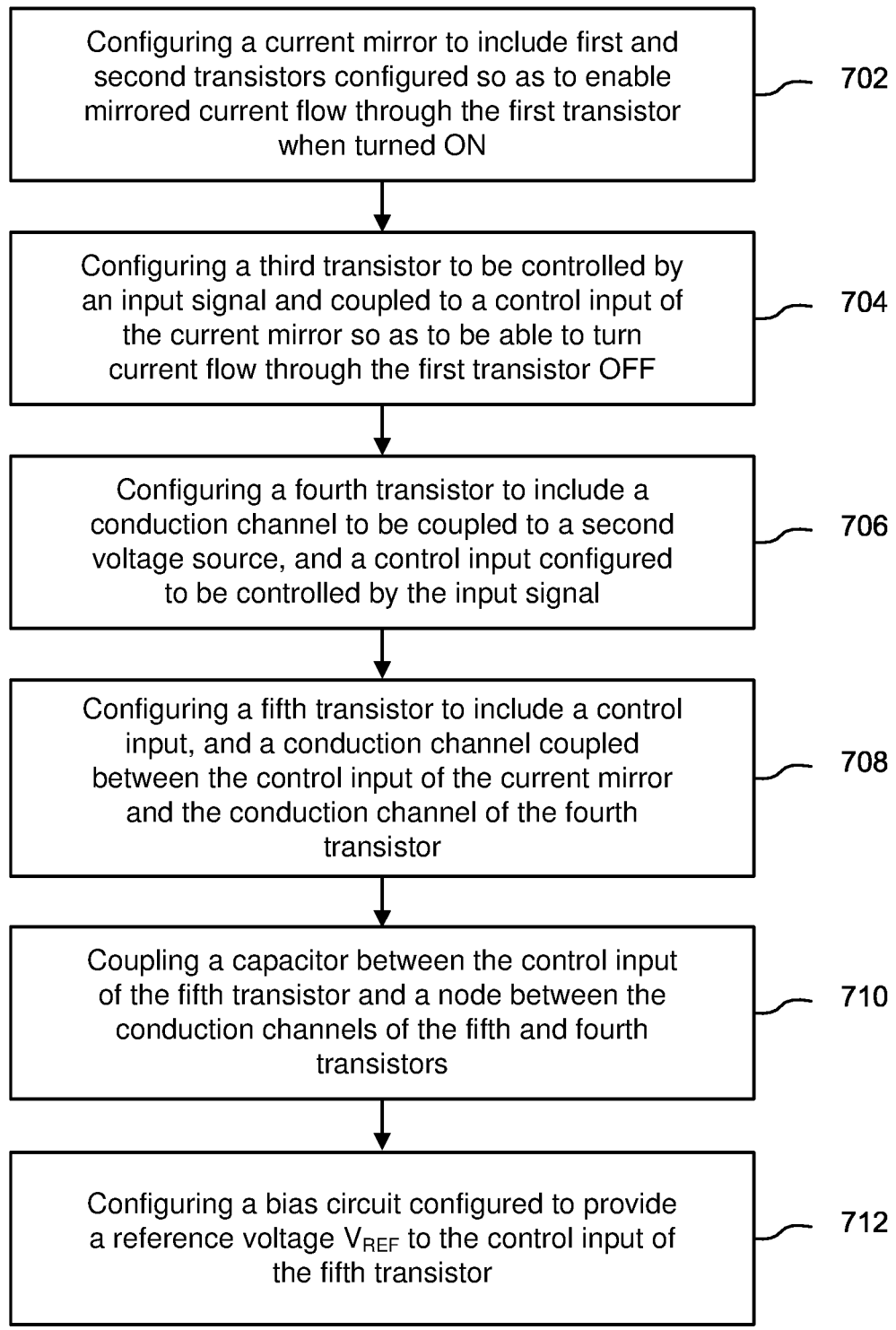
FIG. 7 is a process flow chart showing one method for providing a fast-switching current source.

Another aspect of the invention includes methods of providing a fast-switching current source. For example, FIG. 7 is a process flow chart 700 showing one method for providing a fastswitching current source. The method includes: configuring a current mirror to include first and second transistors configured so as to enable mirrored current flow through the first transistor when turned ON [Block 702]; configuring a third transistor to be controlled by an input signal and coupled to a control input of the current mirror so as to be able to turn current flow through the first transistor OFF [Block 704]; configuring a fourth transistor to include a conduction channel to be coupled to a second voltage source, and a control input configured to be controlled by the input signal [Block 706]; configuring a fifth transistor to include a control input, and a conduction channel coupled between the control input of the current mirror and the conduction channel of the fourth transistor [Block 708]; coupling a capacitor between the control input of the fifth transistor and a node between the conduction channels of the fifth and fourth transistors [Block 710]; and configuring a bias circuit configured to provide a reference voltage $V_{REF}$ to the control input of the fifth transistor [Block 712].

Additional aspects of the above method may include one or more of the following: wherein the first transistor, the diode-connected second transistor, and the fifth transistor are PFETs; wherein the third transistor is a PFET; wherein the fourth transistor is an NFET; wherein the bias circuit includes a current source configured to be coupled to the second voltage source, a diode-connected sixth transistor including a control input and including a conduction channel coupled in series with the current source, and a diode-connected seventh transistor including a conduction channel coupled in series with the conduction channel of the diode-connected sixth transistor and configured to be coupled to the first voltage source, wherein the control input of the diode-connected sixth transistor is connected to the control input of the fifth transistor; wherein the diode-connected sixth transistor and the diode-connected seventh transistor are PFETs; wherein the first, second, third, fifth, sixth, and seventh transistor are PFETs, and wherein the fourth transistor is an NFET; and/or causing transient voltage dip at the control input of the fifth transistor when the input signal is applied to the fourth transistor, resulting in an overdrive voltage to the fifth transistor which increases its current to quickly pull down a control input of the first transistor.

Fabrication Technologies & Options

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

With respect to the figures referenced in this disclosure, the dimensions for the various elements are not to scale; some dimensions may be greatly exaggerated vertically and/or horizontally for clarity or emphasis. In addition, references to orientations and directions (e.g., "top", "bottom", "above", "below", "lateral", "vertical", "horizontal", etc.) are relative to the example drawings, and not necessarily absolute orientations or directions.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other enhancement-mode transistor technologies. Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Conclusion

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A fast-switching current source, including:
   a current mirror configured to be coupled to a first voltage and including first and second transistors configured to enable mirrored current flow through the first transistor when the current mirror is turned ON;
   a third transistor configured to be controlled by an input signal and coupled to a control input of the current mirror, wherein the third transistor is configured to selectively enable and disable the current mirror according to the input signal;

a capacitor;
a fourth transistor including a conduction channel configured to be coupled to a second voltage and a control input configured to be controlled by the input signal, wherein the conduction channel of the fourth transistor is coupled to the capacitor;
a fifth transistor including a control input and a conduction channel coupled between the conduction channel of the second transistor and the conduction channel of the fourth transistor, wherein the control input of the fifth transistor is coupled to the capacitor,
wherein a first terminal of the capacitor is coupled to the control input of the fifth transistor, and
wherein a second terminal of the capacitor is coupled to the conduction channels of both the fifth and fourth transistors; and
a bias circuit configured to provide a reference voltage VREF to the control input of the fifth transistor.

2. The fast-switching current source of claim 1, wherein the first transistor, the second transistor, and the fifth transistor are PFETs.

3. The fast-switching current source of claim 1, wherein the third transistor is a PFET.

4. The fast-switching current source of claim 1, wherein the fourth transistor is an NFET.

5. The fast-switching current source of claim 1, wherein the bias circuit includes:
a current source configured to be coupled to the second voltage;
a diode-connected sixth transistor including a control input, and a conduction channel coupled in series with the current source; and
a diode-connected seventh transistor including a conduction channel coupled in series with the conduction channel of the diode-connected sixth transistor and configured to be coupled to the first voltage,
wherein the control input of the diode-connected sixth transistor is connected to the control input of the fifth transistor.

6. The fast-switching current source of claim 5, wherein the diode-connected sixth transistor and the diode-connected seventh transistor are PFETs.

7. The fast-switching current source of claim 5, wherein the first transistor, the second transistor, the third transistor, the fifth transistor, the diode-connected sixth transistor, and the diode-connected seventh transistor are PFETs, and wherein the fourth transistor is an NFET.

8. The fast-switching current source of claim 1, wherein the capacitor is configured to provide a transient voltage dip at the control input of the fifth transistor when the input signal is applied to the fourth transistor, resulting in an overdrive voltage to the fifth transistor which increases its current to quickly pull down a control input of the first transistor.

9. A fast-switching current mirror circuit, including:
a first transistor configured to be coupled to a first voltage and to other circuitry;
a diode-connected second transistor coupled to the first transistor in a current mirror configuration configured to enable mirrored current flow through the first transistor;
a third transistor including a gate configured to be coupled to an input node, and a conduction channel configured to be coupled to the first voltage and coupled to a gate of the first transistor and a gate of the diode-connected second transistor;
a capacitor;
a fourth transistor including a conduction channel configured to be coupled to a second voltage, and a gate configured to be coupled to the input node, wherein the conduction channel of the fourth transistor is coupled to the capacitor; and
a fifth transistor including a conduction channel coupled between the conduction channel of the diode-connected second transistor and the conduction channel of the fourth transistor, and a gate coupled to a bias circuit, wherein a control input of the fifth transistor is coupled to the capacitor, wherein a first terminal of the capacitor is coupled to the control input of the fifth transistor, and wherein a second terminal of the capacitor is coupled to the conduction channels of both the fifth and fourth transistors, and
wherein the capacitor provides a transient voltage dip at the gate of the fifth transistor when an input signal is applied to the gate of fourth transistor, resulting in an overdrive voltage to the fifth transistor which increases its current to quickly pull down a gate of the first transistor.

10. The fast-switching current mirror circuit of claim 9, wherein the bias circuit is configured to provide a reference voltage VREF to the gate of the fifth transistor.

11. The fast-switching current mirror circuit of claim 9, wherein the first transistor, the diode-connected second transistor, and the fifth transistor are PFETs.

12. The fast-switching current mirror circuit of claim 9, wherein the third transistor is a PFET.

13. The fast-switching current mirror circuit of claim 9, wherein the fourth transistor is an NFET.

14. The fast-switching current mirror circuit of claim 9, wherein the bias circuit includes:
a current source configured to be coupled to the second voltage;
a diode-connected sixth transistor including a gate, and a conduction channel coupled in series with the current source; and
a diode-connected seventh transistor including a conduction channel coupled in series with the conduction channel of the diode-connected sixth transistor and configured to be coupled to the first voltage,
wherein the gate of the diode-connected sixth transistor is connected to the gate of the fifth transistor.

15. The fast-switching current mirror circuit of claim 14, wherein the bias circuit is configured to provide a reference voltage VREF to the gate of the fifth transistor.

16. The fast-switching current mirror circuit of claim 14, wherein the diode-connected sixth transistor and the diode-connected seventh transistor are PFETs.

17. The fast-switching current mirror circuit of claim 14, wherein the first transistor, the diode-connected second transistor, the third transistor, the fifth transistor, the diode-connected sixth transistor, and the diode-connected seventh transistor are PFETs, and wherein the fourth transistor is an NFET.

18. A fast-switching current mirror circuit, including:
a first transistor configured to be coupled to a first voltage and to other circuitry;
a diode-connected second transistor coupled to the first transistor in a current mirror configuration configured to enable mirrored current flow through the first transistor;
a third transistor including a gate configured to be coupled to an input node, and a conduction channel configured to be coupled to the first voltage and coupled to a gate of the first transistor and a gate of the diode-connected second transistor;

a fourth transistor including a conduction channel configured to be coupled to a second voltage, and a gate configured to be coupled to the input node;

a fifth transistor including a conduction channel coupled between the conduction channel of the diode-connected second transistor and the conduction channel of the fourth transistor, and a gate;

a capacitor coupled between the gate of the fifth transistor and a drain of the fifth transistor and a drain of the fourth transistor;

a bias circuit including:
- a current source configured to be coupled to the second voltage;
- a diode-connected sixth transistor including a gate, and a conduction channel coupled in series with the current source; and
- a diode-connected seventh transistor including a conduction channel coupled in series with the conduction channel of the diode-connected sixth transistor and configured to be coupled to the first voltage, wherein the gate of the diode-connected sixth transistor is connected to the gate of the fifth transistor.

19. The fast-switching current mirror circuit of claim 18, wherein the bias circuit is configured to provide a reference voltage VREF to the gate of the fifth transistor.

20. The fast-switching current mirror circuit of claim 18, wherein the diode-connected sixth transistor and the diode-connected seventh transistor are PFETs.

21. The fast-switching current mirror circuit of claim 18, wherein the first transistor, the diode-connected second transistor, and the fifth transistor are PFETs.

22. The fast-switching current mirror circuit of claim 18, wherein the third transistor is a PFET.

23. The fast-switching current mirror circuit of claim 18, wherein the fourth transistor is an NFET.

24. The fast-switching current mirror circuit of claim 18, wherein the first transistor, the diode-connected second transistor, the third transistor, the fifth transistor, the diode-connected sixth transistor, and the diode-connected seventh transistor are PFETs, and wherein the fourth transistor is an NFET.

* * * * *